Dec. 15, 1970 G. W. COOK 3,546,948
SYSTEM FOR EVALUATION OF IRREGULARITIES ON LARGE SURFACES
Original Filed Dec. 27, 1966 2 Sheets-Sheet 1

George W. Cook
INVENTOR.

BY Thomas W. Brennan

Dec. 15, 1970   G. W. COOK   3,546,948
SYSTEM FOR EVALUATION OF IRREGULARITIES ON LARGE SURFACES
Original Filed Dec. 27, 1966   2 Sheets-Sheet 2

George W. Cook
INVENTOR.

BY Thomas W. Brennan

United States Patent Office 3,546,948
Patented Dec. 15, 1970

3,546,948
SYSTEM FOR EVALUATION OF IRREGULARITIES ON LARGE SURFACES
George W. Cook, McLean, Va., assignor to Thiokol Chemical Corporation, Bristol, Pa., a corporation of Delaware
Original application Dec. 27, 1966, Ser. No. 605,009, now Patent No. 3,475,954, dated Nov. 4, 1969. Divided and this application June 23, 1969, Ser. No. 851,517
Int. Cl. G01p *3/26;* G01c *19/14*
U.S. Cl. 73—505
5 Claims

ABSTRACT OF THE DISCLOSURE

A system for determining the bumpiness of large surfaces, such as the surfaces of highways or air fields, the system including a wheeled vehicle carrying an angular velocity meter which measures the pitching rate of the vehicle and provides an electrical output representing the rate of change of slope of the surface, the meter having a pair of tubular loops containing hydraulic fluid pumped through the loops at the same speed but in opposite directions, and a differential pressure device interconnecting the loops and sensitive to angular rotation of the loops.

---

This application is a division of pending application Ser. No. 605,009, filed Dec. 27, 1966, now Pat. No. 3,475,954.

The present invention relates to a system for quantitative evaluation of the unevenness or irregularities on large surfaces, and more particularly to a system for checking the surface of highways or the like for determining whether such surfaces possess irregularities which are excessive, and marking such irregular surface for correction or repair.

The first tangible evidence of distress in a roadway or other surface is a structural deformation producing an irregularity on the surface. If such a defect is located and repaired promptly, the cost is relatively minor. However, if it is not tended to until after the surface starts to break up, which deterioration could take place in a short time depending on the nature and amount of the road traffic, the repair operation becomes major and costly. Perhaps even greater importance attaches to such defects in the surfaces of high speed jet airfields and railways because of the possibility of also inducing harmful vibrations and other adverse effects in the vehicles travelling over such surfaces. With the advent of supersonic jets and ultra high speed trains and the thousands of miles of roads, railways and airfields already in existence and planned, examination of these surfaces by manual means, such as the rod and level, is already an impossible task. A considerable amount of effort has been expended in the design and development of machines which can be run over road surfaces to obtain automatically information concerning irregularities on the surfaces. However, the goal has been to duplicate in large measure the work of a surveying team obtaining data by means of a rod and level with the result that the work done on such machines has been to produce a machine which obtained data relating to the profile of the roadway, i.e., measurement of elevation at spaced points along the length of the roadway. But applicant has observed that information in the form of elevation or profile data is not useful directly for the reason that the meaningful measure of unevenness or "bumpiness" in a surface derives from the changes in a slope on that surface; in other words, a "bump" cannot exist without a change in slope, and elevation or profile information must be differentiated twice with respect to the distance travelled in order to arrive at the necessary data form. Put another way, a change in slope of a line or surface is characterized by the physical quantity known as "curvature" and the curvature of a line is a direct measure of the rate-of-change of slope with respect to the distance travelled along the line or curve. A system or technique wherein curvature is measured directly would be useful since then no basic conversion operations are required to evaluate the unevenness of the surface under examination.

The fundamental definition of curvature at a point on any line or curve is:

$$K = \lim_{s \to 0} \frac{\Delta T}{\Delta s} = \frac{dT}{ds} \quad (1)$$

where:

K is the curvature
*s* is the segment of the curve
T is the angle subtended by the segment The tangential velocity along any curve may be defined as the time-rate-of-change of distance along the curve which, in turn, may be defined as the radius of curvature times the time-rate-of-change of the angle subtended by the segment of the curved traversed. Thus, algebraically:

$$V_t = \frac{ds}{dt} = R \frac{dT}{dt} \quad (2)$$

where:

$V_t$ is the tangential velocity
R is the radius of curvature, and
*s* and T are as hereinbefore defined By definition, time-rate-of-change of the angle is the angular velocity or $dT/dt = w$ from which Equation 2 may be rewritten as:

$$V_t = Rw \quad (3)$$

Since curvature is the reciprocal of the radius of curvature:

$$K = \frac{1}{R}$$

And the angular velocity may be defined as:

$$w = \frac{1}{R} V_t = K V_t \quad (4)$$

Substitution of equivalents in Equation 4 yields:

$$\frac{dT}{dt} = K \frac{ds}{dt}$$

Multiplying both sides by $dt/ds$ gives:

$$\frac{dT}{ds} = K$$

which is the fundamental definition of curvature.

Thus, Equation 4 is seen as a true representation of the curvature and it is clear that the angular velocity is a direct measure of the curvature provided that the tangential velocity is finite and held constant. Also, it is seen that the relationship is linear and that no data processing is required to obtain the necessary curvature quantity.

It is therefore an object of the present invention to provide means for directly measuring the curvature of a surface under examination for determining the irregularities or unevenness thereof.

Another object is the provision of means which sense the unevenness of a surface and record information thereof for analysis and evaluation.

A further object is to provide means to ascertain excessive irregularities on a surface and mark the same.

Still another object is the provision of means for indicating relative changes in heading, which means is non-gyroscopic and of rugged construction.

In accordance with the invention, there is provided a system comprising a vehicle having an angular velocity meter mounted thereon and rollers which follow the profile of the surface under examination, the meter measuring the pitching rate of the vehicle while travelling over the surface and providing an output representative of the rate of change of slope of the surface.

The exact nature of this invention as well as other objects, features and advantages thereof will become better understood by reference to the following detailed description considered in connection with the accompanying drawings in which.

Figure 1:
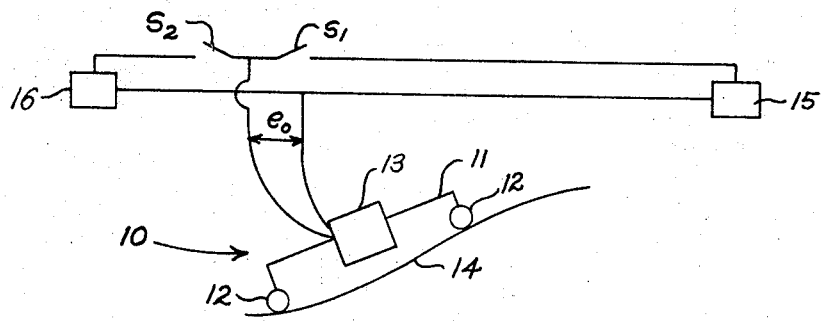
FIG. 1 is a schematic representation of a sensor vehicle or carriage which may be employed in accordance with the invention.

Referring now to the drawings, wherein like reference characters designate like or corresponding parts, there is shown in FIG. 1, in schematic form, a sensor carriage or vehicle designated generally by reference numeral 10 and comprising a frame or chassis 11 mounted on a pair of rollers or wheels 12 and supporting angular velocity measuring means or meter 13, wheels 12 being adapted to follow the profile of a surface 14. The angular velocity measuring means is fixed to chassis 11 and is adapted to measure directly the pitching rate of the chassis and deliver an output voltage $e_0$ which may be applied by suitable leads and switch means $S_1$, $S_2$ to data recording means 15 or to servo means 16, or both, as desired.

Figure 2:
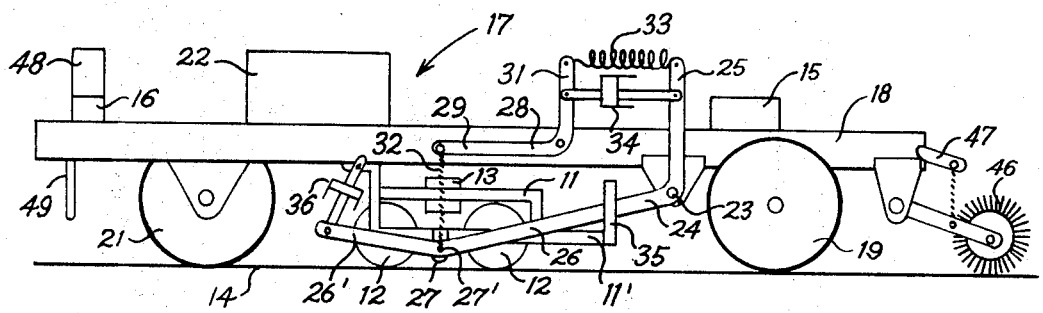
FIG. 2 is a schematic showing of one embodiment of the vehicle of FIG. 1 adapted to be propelled by a powered land vehicle.

In FIG. 2 there is shown, in schematic, a powered land vehicle designated generally by reference numeral 17 and comprising a chassis or frame 18 supported on a pair of steerable wheels 19 and a single driven wheel 21 adapted to be driven by power means 22. Pivotally connected to the chassis 18, as at 23, is a towing means 24, generally in the form of a bellcrank and having a vertical portion 25 and a generally horizontal towbar portion 26 which may take the form of a wishbone yoke. Portion 26 is pivotally connected, as at 27', to a pair of connectors 27 fixed to the sides of chassis 11, the pivot connections 27' providing a generally horizontal pivot axis disposed below a line through the centers of rotation of wheels 12.

Provision is made for swinging towing means 24 in one direction to lift wheels 12 off surface 14 and in the other direction to force the wheels against the surface. To this end there is provided an adjustable bellcrank 28 having a horizontal member 29 and a vertical member 31, member 29 being attached by a flexible connection 32 to portion 26 of the towing means and member 31 being connected to portion 25 of the towing means by a tension spring 33. It is to be understood that bellcrank 28 may be locked in any desired position of adjustment by any conventional means (not shown) and may be adjusted to positions in which flexible connection 32 is slackened and spring 33 is stressed and wheels 12 are pressed against surface 14 with a force of about three to seven times their weight to reduce bouncing. Wheels 12 are provided with semicompliant tires (not shown) to absorb severe road shocks and additional vibration damping may be provided by the use of dash pot means 34 or the like. Pivotal movement of chassis 11 relative to the towing means is limited by a U-shaped strap 35 secured to an extension 11' of chassis 11 and extending over portion 26 of the towing means for engagement thereby when the towing means is lifted; vibration damping therebetween being provided by means of a dash pot 36 or the like connected between chassis 11 and an extension 26' of portion 26.

The angular velocity measuring means 13 carried by the chassis 11 may be of any form which reads out the angular velocity or pitching rate of the chassis. For example, the widely-used rate-gyro, which is essentially a single degree of freedom device providing an output signal proportional to the velocity of rotation of the device about its input axis, could be used for this purpose. Thus, fixed in proper orientation to the frame of a vehicle adapted to travel over a surface having changes in slope the rate gyroscope can be made to read out directly the pitching rate of the vehicle induced by the changes in slope during constant speed travel of the vehicle.

However, as a practical matter, the rate gyroscope is not sufficiently rugged to withstand shocks imparted to the sensor vehicle by holes and other very rough spots in the road surface. It is therefore preferred to substitute for the rate-gyro an hydraulic angular velocity indicator, hereinafter referred to as HAVI, which serves to indicate relative changes in heading in any plane but is not a gyroscope, there being no gimbal rings or critical bearings such as those characteristic of gyroscopic installations, and is of sufficiently rugged construction to accommodate road shocks.

Figure 3:
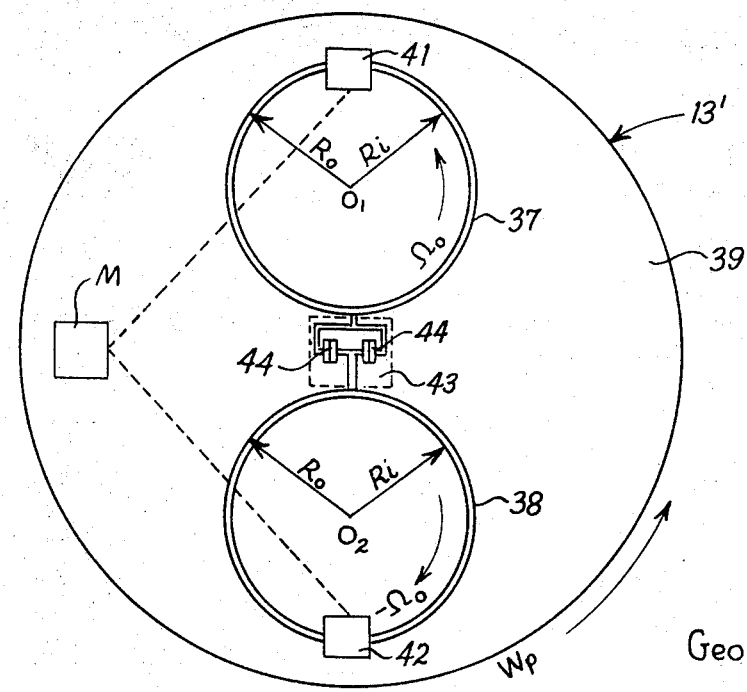
FIG. 3 is a schematic representation of the means for indicating relative changes in heading.

The fundamental principle of operation of the HAVI is based on the Coriolis effect which has to do with the behavior of particles following curvilinear paths on a rotating reference. In its broadest aspects, the HAVI comprises two counterrotating masses of fluid having angular velocities of opposite values. Turning now to FIG. 3, the HAVI 13' may take the form of a pair of identical circular loops 37, 38 mounted on a supporting platform 39. Each loop is provided with a positive displacement pump, the two identical pumps 41 and 42 being interconnected for rotation at the same speed from a single motor M and having equal volumetric deliveries for pumping a mass of fluid filling loop 37 in a direction opposite to that of an equal mass of fluid filling loop 38. Diametrically opposite the pumps is a differential pressure sensor 43 containing a pair of conventional differential pressure gages 44 which are tapped into the loops 37, 38. Since the loops and pumps are identical, the angular velocities of the fluid masses in the loops induced by the pumping are equal in magnitude but opposite in direction and may be designated $\Omega_o$ and $-\Omega_o$ for loops 37 and 38 respectively. As the particles of fluid rotate due to the pumping, centripetal acceleration forces $a_{c1}$ and $a_{c2}$ are directed toward the loop centers $O_1$ and $O_2$. When the platform 39 is stationary, these acceleration forces are equal and have a common value designated $a_c$; thus:

$$a_o = a_{o1} = a_{o2} = \left(\frac{R_o + R_i}{2}\right)\Omega_o^2 \qquad (5)$$

where:

$R_o$ and $R_i$ are the outer and inner radii of either loop
$\Omega_o$ is the angular velocity of the fluid particles due to pumping.

However, if now the platform 39 is rotated in the direction of the arrow at an angular rate $w_p$, the spatial velocities of the fluid in the loops are no longer equal since in the one case the rotation of the platform is in the same direction as the rotation of the fluid in loop 37 while in the case of loop 38 it is against the direction of fluid rotation. The spatial angular velocity of the fluid particles in loop 37 is then:

$$\Omega_1 = w_p + \Omega_o \qquad (6)$$

and in loop 38:

$$\Omega_2 = w_p - \Omega_o \qquad (7)$$

from which the centripetal acceleration forces may be evaluated as:

$$a_{c1} = \left(\frac{R_o + R_i}{2}\right)\Omega_1^2 = \left(\frac{R_o + R_i}{2}\right)(w_p + \Omega_o)^2 \quad (8)$$

$$a_{c2} = \left(\frac{R_o + R_i}{2}\right)\Omega_2^2 = \left(\frac{R_o + R_i}{2}\right)(w_p - \Omega_o)^2 \quad (9)$$

and the difference is then:

$$a_{c1} - a_{c2} = \left(\frac{R_o + R_i}{2}\right)(4w_p\Omega_o) \quad (10)$$

from which it is apparent that the angular rate of turn of the platform can be determined in terms of sense and magnitude by suitable and appropriate means which measure and evaluate the difference in the acceleration forces. It is further apparent that if thi sdifference is integrated as a function of time, any change in the angular position of the platform can be measured and evaluated.

The tangential velocity of the field in either loop is:

$$V_f = \left(\frac{R_o + R_i}{2}\right)\Omega_o \quad (11)$$

and Equation 10 may now be written as:

$$a_{c1} - a_{c2} = 4V_f w_p \quad (12)$$

In classical mechanics the Coriolis "acceleration" is expressed as $2Vw$. The result shown in the right-hand portion of Equation 12 is seen as twice the Coriolis "acceleration."

Figure 4:
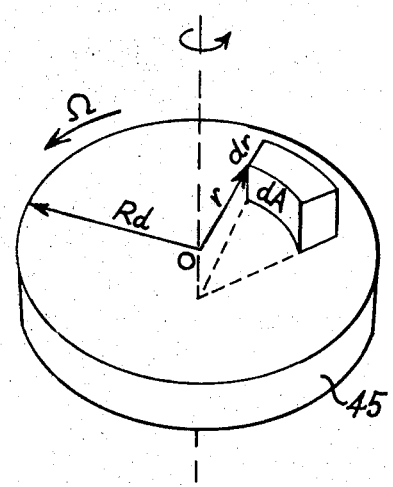
FIG. 4 is a schematic representation, in perspective, of a thin disk or "pancake" of rotating fluid.
Figure 4A:
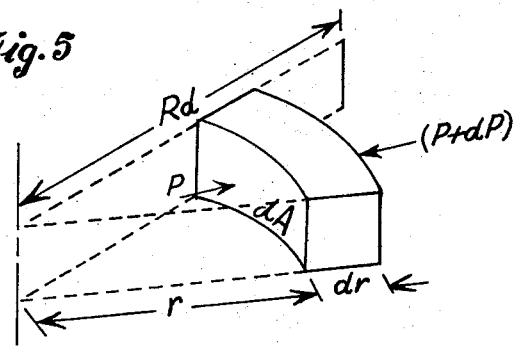
FIG. 4a is a showing of a portion of FIG. 4, on an enlarged scale and illustrating the forces acting on a differential element of fluid.

Considering further the forces acting on the particles of a rotating fluid mass, attention is directed to FIG. 4 which illustrates a rotating disk or "pancake" 45 of fluid having a center O, a radius $R_d$, mass density $\rho$ and an angular velocity $\Omega$. A differential element of fluid at radius $r$, having an area $dA$ and a radial thickness $dr$, has acting on it an outwardly directed pressure $P$ and an inwardly directed pressure $P + dP$ (FIG. 4a) and the restraining force F acting on the element is:

$$F = dPdA \quad (13)$$

where:

$dP$ is the net pressure on the element
$dA$ is the area on which pressure $dP$ acts Classically, the force F is also:

$$F = ma_{ce} \quad (14)$$

where:

$m$ = the mass of the fluid in the differential element
$a_{ce}$ = the centripetal acceleration acting on the element Since the volume of the element is $dA\, dr$, the mass may be expressed as:

$$m = \rho dA dr$$

and the centripetal acceleration as:

$$a_{ce} = r\Omega^2$$

from which Equation 14 may be rewritten as:

$$F = (\rho dA dr)(r\Omega^2) = \rho \Omega^2 r dr dA \quad (15)$$

Equating Equations (13) and (15) gives:

$$dPdA = \rho\Omega^2 r dr dA \text{ or}$$
$$dP = \rho\Omega^2 r dr \quad (16)$$

which is the differential equation for the centrifugal reaction pressure in the rotating fluid disk 45 from which the pressure at the edge of the disk may be found:

$$P = \int dP = \rho\Omega^2 \int_0^{R_d} r dr = \frac{R_d^2}{2}\rho\Omega^2 \quad (17)$$

Where the configuration of the rotating fluid is a ring or loop having an outer radius $R_o$ and an inner radius $R_i$ the pressure at the outside of the ring is:

$$P = \rho\Omega^2 \int_{R_i}^{R_o} r dr = \frac{R_o^2 - R_i^2}{2}\rho\Omega^2 \quad (18)$$

from which it is clear that the centrifugal reaction pressure developed in a confined rotating fluid body is a function of the mass density of the fluid, its angular velocity and a design constant.

Returning to FIG. 3 and referring again to Equations 6, 7 and 18 the centrifugal reaction pressure in each loop can be determined when the true spatial angular velocity is used in place of the general term $\Omega$:

Loop 37: $P_1 = \dfrac{R_o^2 - R_i^2}{2}\rho(w_p + \Omega_o)^2 \quad (19)$

Loop 38: $P_2 = \dfrac{R_o^2 - R_i^2}{2}\rho(w_p - \Omega_o)^2 \quad (20)$

The difference or differential pressure $\Delta P$, is:

$$\Delta P = P_1 - P_2 = \rho(R_o - R_i)\left[\left(\frac{R_o + R_i}{2}\right)(4w_p\Omega_o)\right] \quad (21)$$

a quantity which can be measured by the differential pressure sensor 43.

Employing the equality in Equation 11, Equation 21 may be rewritten as:

$$\Delta P = \rho(R_o - R_i)(4V_f w_p) \quad (22)$$

from which it is seen that the differential pressure is twice the Coriolis acceleration multiplied by a design constant involving the mass density of the fluid and a radial dimension and is therefore directly proportional to such acceleration.

Furthermore, comparing Equations 12 and 22 the differential pressure is seen as a directly proportional measure of the difference between the centripetal acceleration forces.

Figure 5:
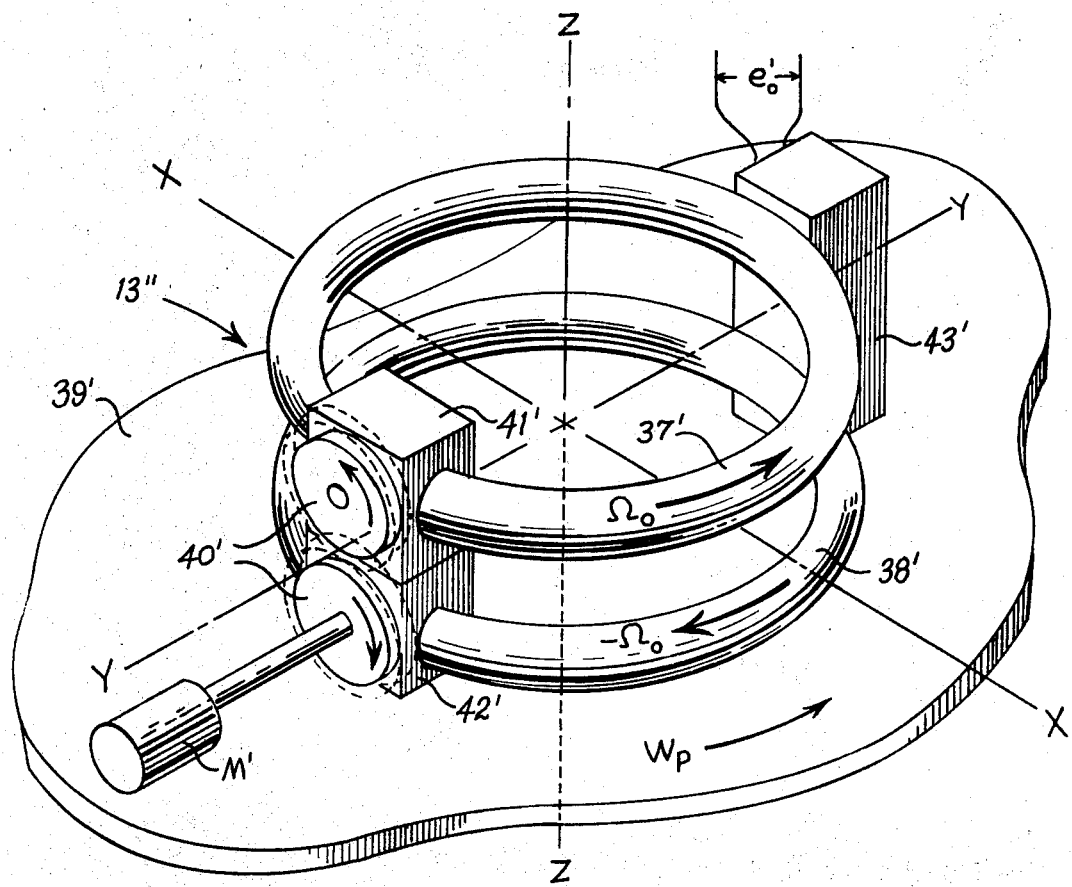
FIG. 5 is a perspective view of a more practical arrangement of the indicating means of FIG. 3.

Turning now to FIG. 5, there is shown a more practical arrangement of the HAVI, designated generally by reference numeral 13" in which identical loops of tubing 37', 38', toroidal in form, are mounted on a platform 39' adjacent each other and have a common central axis Z—Z for rendering the HAVI immune to extraneous and spurious forces. Loops 37' and 38' have associated therewith identical pumps 41' and 42' respectively which are geared together as at 40' for operation in unison by an electric motor M'. Diametrically opposite the pumps is a differential pressure sensor means 43' containing a pair of pressure gages (not shown), which are in communication with the loops 37' and 38' and a pressure transducer means (not shown) operatively connected to the pressure gages for delivering an electrical voltage output $e_o'$ representative of the differential pressure.

The pressure $P_p$ across each pump 41' and 42' is made up of a component at the positive pressure or force side of the pump and a component at the negative pressure or suction side of the pump, the former having a value of $P_p/2$ and the latter a value of $-P_p/2$, assuming the pump to have zero length. Progressing around the associated loop, the pump pressure falls uniformly and passes through zero halfway around, or diametrically opposite the pump, at the point where the associated pressure gage is tapped into the loop. Thus, the pressure at each gage point is zero with respect to its associated pump and the differential pressure between the two gage points due to the pumping effort is 0—0=0.

Referring to Equations 19 and 20, it will be appreciated that the change in pressure in each loop 37' and 38' due to the angular velocity $w_p$ of the platform 39' about the Z—Z axis is additive in loop 37' and subtractive in loop 38' and the differential pressure between the loops is thus equal to twice the change in pressure in each loop and is the useful output signal of the HAVI.

The effect of angular acceleration about the Z—Z axis is a pressure change across each pump 41' and 42', the component of such pressure change on one side of a pump being of equal magnitude but opposite value to the pressure change component on the other side of the pump with the result that the effect is self-cancelling in each loop. In this case the pressure at each gage point is zero and the differential pressure is 0—0=0.

In the case where the loops are subjected to linear acceleration along the Z—Z axis, there is no pressure change around the loops and the pressure due to such acceleration at the pumps and gage points is zero and the differential pressure is 0—0=0. However, linearly accelerating the loops along the X—X axis results in a pressure build up in the trailing half of the loop and a corresponding reduction in pressure in the leading half of the loop with zero pressure at the pumps and gage points and again the differential pressure is 0—0=0. Linear acceleration along the Y—Y axis similarly increases and decreases the pressure in the loops but now the maxima and minima occur at the pumps and the gage points and the differential pressure developed equates to zero.

Rotation of the loops about the X—X axis induces equal increases in pressure in the loop halves on each side of the axis, the maxima occurring at the pumps and the gage points and the differential pressure equating to zero. With rotation about the Y—Y axis, the maxima occur between the pumps and the gage points, the pressure at the pumps and gage points being zero and the differential pressure being 0—0=0.

From the foregoing, it is clear that the HAVI can be subjected to accelerations and motions about the several axes simultaneously and that the differential pressure developed will be proportional only to the angular velocity of the HAVI about the Z—Z axis, that is, the central axis of the loops. This freedom of sensitivity from all other motions is an important advantageous feature of the HAVI. Also, the fluid particles in the loops are forced to follow paths which they would not follow were it not for the constraint of the circular conduits, and the fluid pressures at the respective gage points serve as direct measures of these constraining forces. With the fluid in the loops in counter-rotation, an hydraulic force balance, much like the electrical equivalent known as the Wheatstone Bridge, is established, the hydraulic "bridge" being unbalanced by rotation of the loops about their common central axis and the magnitude of the unbalanced forces showing up as a differential pressure which is proportional to four times the product of the fluid velocity and the angular velocity of rotation of the loops. The unbalanced forces are also a direct measure of the changes in centripetal forces acting on the fluid particles. The HAVI can therefore be used as a basic sensor for a variety of systems and possesses the advantage of the elimination of the need for gimbals and critical bearings.

In its application to the sensor vehicle 10 of FIG. 1, the HAVI 13" replaces the angular velocity measuring means 13 and is rigidly mounted on the vehicle with the central axis (Z—Z axis in FIG. 5) of the loops located coincident with, or close and parallel to, the pivot axis 27' of the vehicle.

In order to simplify the speed control of the land vehicle 17, and of the sensor vehicle 10, drive wheel 21 may be driven by an electric motor contained in the power means 22 which means also contains a speed control for the motor, batteries to drive the motor and a gasoline engine and a generator for charging the batteries; power for motor M' of the HAVI 13" being taken from the batteries. Additionally, a tachometer generator may be coupled to one of the sensor wheels 12 and its output voltage applied to a reciprocal modulator for varying a variable amplitude coefficient of the output voltage $e_o$ from the meter 13, or $e_o'$ from the HAVI 13", inversely with respect to the tangential velocity of the wheel, thus tending to keep the product of the amplitude coefficient and vehicle velocity constant over a limited range and thereby reducing the requirement that the speed of the land vehicle be maintained constant. If desired, vehicle 17 may be provided with a road sweeper 46 for the purpose of clearing the surface ahead of any debris in the path of the vehicles, conventional means 47 serving to lift the sweeper.

The output voltage $e_o$ of the meter 13, or $e_o'$ of the HAVI 13", may be applied to the data recording means 15 which may be any one of the several types available, the simplest type being a direct-writing graphic strip-chart recorder on which are recorded: (1) the net output signal of the angular velocity meter (which indicates the "bumpiness" directly), (2) the distance travelled (which conveniently may be indicated by means coupled to one of the sensor wheels for generating a pip marker on the chart for each revolution of the wheel) and (3) time markers on the chart for verifying the running speed of the land vehicle.

The output $e_o$ or $e_o'$ may also be connected to servo means 16 which is then actuated whenever the output exceeds a predetermined value which is indicative of extreme unevenness or "bumpiness" of the roadway. When actuated, servo means 16 controls the flow of paint or other marking material from a container 48 through a pipe 49 for marking the road surface. Such marks indicate points where, upon closer examination, maintenance work is required or desired.

In operation, the sensor vehicle 10 is moved at a predetermined speed with wheels 12 in contact with surface 14 and chassis 11 pivoting relative to towbar 26 as the wheels travel over irregularities in the surface. The signals from angular velocity meter 13, or from the HAVI 13", are fed to the data recording means 15 or servo means 16, or both, as desired. Vehicle 10 may be moved over the surface at relatively high speeds so that a relatively long length of surface may be examined or checked in a short time. For examination of wider surfaces, such as landing fields for aircraft, several sensor vehicles may be positioned alongside each other and several lines then checked simultaneously.

There has thus been provided means for directly measuring the unevenness or irregularities in a surface and accumulating data relative thereto and/or marking excessive irregularities. Obviously many modifications and variations of the present invention are possible in light of the above teachings. It is therefore to be understood that the invention may be practiced otherwise than as specifically described.

What is claimed is:

1. Hydraulic angular velocity indicating means comprising, in combination:
   a pair of conduits of like configuration and dimensions forming closed loops, mounted on a member whose angular velocity is to be sensed with the axis about which rotation is to be sensed extending perpendicular to and through said loops;
   equal masses of fluid filling said conduits;
   means connected to the conduits for moving said masses of fluid each in its respective conduit at equal speeds but in opposite directions; and
   differential pressure means interconnecting said conduits for measuring the difference between the pressures of said masses of fluid.

2. The combination of claim 1 wherein said conduits are circular, and said means for moving the masses of fluid comprise a pair of identical pumps, one each associated with a conduit respectively, said pumps being interconnected for operation in unison, and said differential pressure means interconnecting points on the conduits most distant from the pumps.

3. The combination of claim 2 wherein each of said conduits has the shape of a torus, and the conduits are disposed in parallelism and have a common central axis.

4. The combination of claim 2 wherein said conduits are disposed coaxially adjacent each other, and said pumps are geared together for operation by a single motor.

5. The combination of claim 2 wherein said conduits are coaxial, and said conduits and pumps are closely adjacent each other, and said differential pressure means are diametrically opposite the pumps.

References Cited
UNITED STATES PATENTS
3,372,596   3/1968   Keller _____ 73—505

JAMES J. GILL, Primary Examiner